UNITED STATES PATENT OFFICE.

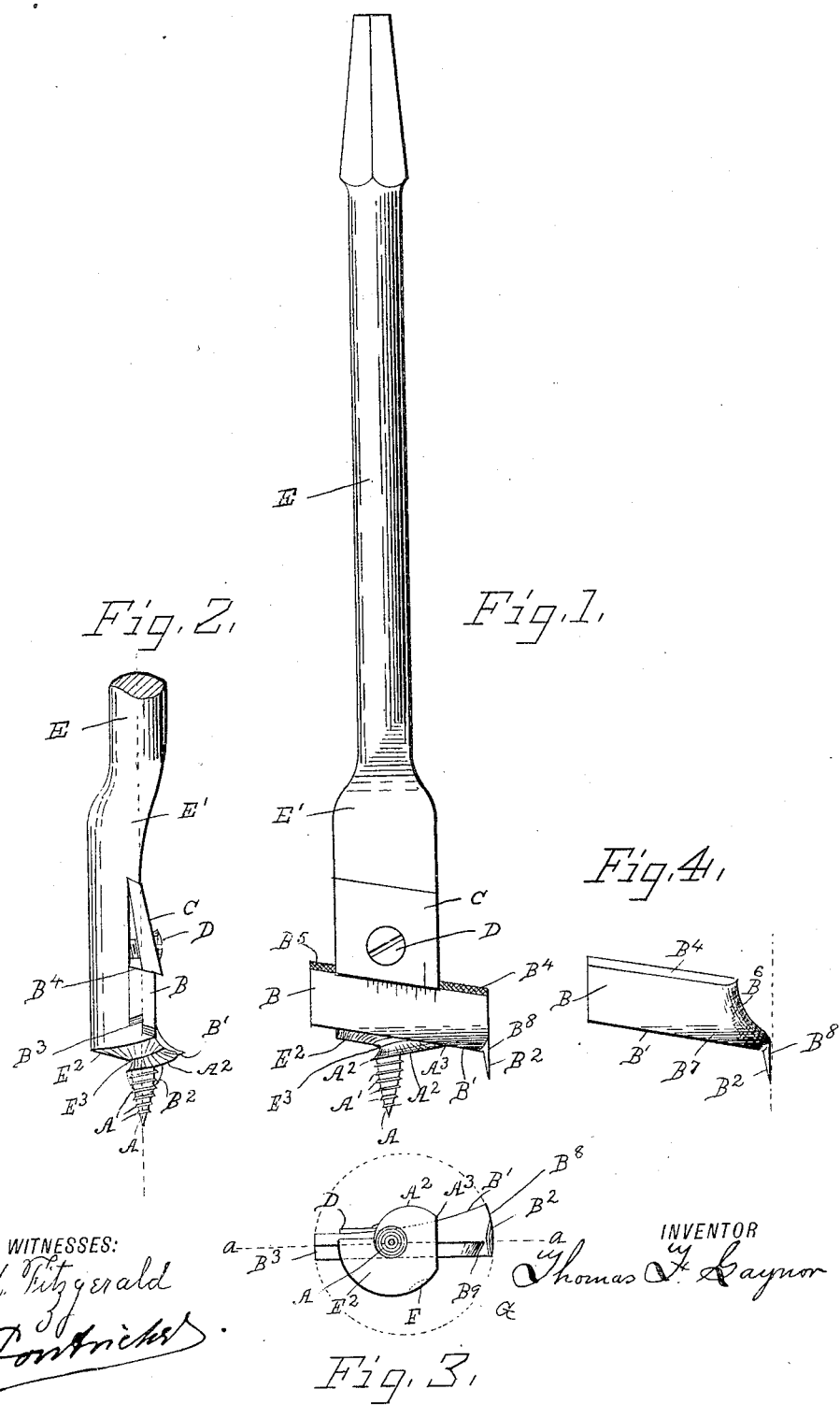

THOMAS F. GAYNOR, OF NEW YORK, N. Y., ASSIGNOR TO TOWER & LYON COMPANY, OF NEW YORK, N. Y., A CORPORATION OF NEW YORK.

EXPANSION-AUGER.

No. 803,223.     Specification of Letters Patent.     Patented Oct. 31, 1905.

Application filed July 6, 1905. Serial No. 268,421.

*To all whom it may concern:*

Be it known that I, THOMAS F. GAYNOR, a citizen of the United States, and a resident of Brooklyn borough, city of New York, and in the county of Kings and State of New York, have invented certain new and useful Improvements in Expansion-Augers, of which the following is a specification.

This invention relates to expansion-augers; and it consists in making an auger with a single cutting-lip developed from the lead-screw to the cutting edge of a radially-adjustable bit or cutter, which edge forms a continuation of said cutting-lip and is in working combination.

It also consists in the beveled shape of the end of the bit, the spur thereon, in combination with said other novel features, and the location of said spur, so that it will always be in the same vertical radial plane with regard to the auger whatever its adjustment.

The object of the invention is to provide an improved tool of this class that will bore holes in wood or the like with the least labor and make them smooth and uniform in size and of any diameter within the limits of the instrument and that will clear the chips as easily as possible.

The nature and objects of the invention will be more fully explained in the following specification and pointed out in the claims, taken together with the accompanying drawings, in which similar letters refer to similar parts.

In the drawings, Figure 1 represents a front elevation of my improvement. Fig. 2 is a side elevation of the head and lead-screw portions of Fig. 1. Fig. 3 is an end view of Fig. 1, and Fig. 4 is a front view of the bit beveled according to my invention.

In the drawings, A represents the lead-screw; B, the bit; C, the clamp; D, the clamp-screw, and E the shank, and all being of the materials and construction of tools of this class. The screw A has the usual threads $A'$ $A'$ and the upper one continuing and being developed into the cutting lip or flange $A^2$ and extending radially and outwardly in a convex convolute curve to the point $A^3$ at or near the corresponding point in the edge $B'$ of the bit B, so that the cutting edges of the lip and the bit are practically continuous from the screw to the outer extremity of the bit. The head of the auger is cut away at $E^2$, so as to produce a spiral groove $E^3$, into which the wood readily passes during the boring operation as it is cut and lifted up by the edge $A^2$ of the lip, and the cutting portion of the bit completes the removal of the chip, which is previously cut endwise by the spur $B^2$ of the bit.

By referring to Fig. 3 it can be seen that it requires nearly half a turn of the auger to advance all the parts of the lip $A^2$ to the same line radially—that is, the lip has an oblique shearing cut like that usually given to a knife—which makes it cut very easily and causes the chip to rise up over the edge $B'$ of the bit B as the latter advances and completes the operation.

The bit B is held in a firm position in the head $E'$ of the auger by means of the clamp C and the clamp-screw D, the lower edge $B^3$ and the upper edge $B^4$, respectively, of the bit being shaped so as to make the latter, partly in cross-section, of a dovetailed shape and the corresponding parts of the head $E'$ and the clamp C being beveled to properly fit against the bit and hold it firmly in any position it may be adjusted.

In Fig. 1 the upper edge $B^4$ of the bit B is shown at $B^5$ as having a rough-cut surface, like that of a file, that it may be more firmly held by the clamp C against any possible slipping out of a fixed position during the operation of boring a hole.

By beveling the outer end of the bit B back upwardly and inwardly toward the axis of the auger, as shown at $B^6$ in Fig. 4 a path is made for the chips to freely pass upwardly and behind the bit during the cutting operation. The chips will be cut under and lifted up by the lip $A^2$ at their inner parts near the lead-screw A, while their outer portions will be cut away by the action of the spur $B^2$ and also cut and raised upwardly by the working part of the cutting edge $B'$ of the bit B and then pass over the part $B^7$ and finally go over the bevel $B^6$ thereof, and thus behind the bit and upwardly out of the hole.

The most advanced point of the spur $B^2$ is preferably located so as to be always in the same vertical plane axially no matter what position the bit may be adjusted to that the spur may always be the outermost part of the bit radially. The dotted lines $a\ a$ in Figs. 2 and 3 represent the axial plane in which the point of the spur $B^2$ should always be located, and the seat of the bit in the shank and the form of the back of the bit should be arranged to give the spur-point this adjustable travel to or from the axis of the auger in this same vertical radial plane no matter what the size of the hole may be that it is to produce. This will cause the tool to always make a smooth surface within the hole and there will be no tendency for the bit to change position, and thus make a tapering hole, as sometimes occurs with the ordinary expansive auger. The outer end $B^8$ of the bit should be curved with as small an arc of a circle as the diameter of the smallest sized hole it will work in and, as indicated by the circle G in Fig. 3, that the spur will always be the outermost part of the bit. The undercut of the under edge of the bit can be terminated near the spur, as indicated at $B^9$, Fig. 3, so as to leave metal enough at the root of the spur to give it the requisite support. If it should be desirable, a fixed spur can be arranged on the head of the auger at any point on the periphery thereof, as indicated by the dotted line F in Fig. 3. The bevel $B^6$ on the end of the bit can be of any desired shape, so the chips will clear the bit and the latter will not rub against the wall of the hole at that point.

It can thus be seen that I provide a simple and effective device for the purpose intended and the operation of which can be understood without further explanation and that it will meet all the requirements of such a tool.

Having thus described my invention, what I claim, and desire to secure by Letters Patent, is—

1. An expansible auger comprising in combination with the lead-screw and a single cutting flange or lip developed therefrom, of a radially-adjustable bit having at the bottom a forwardly-projecting cutting edge forming a continuation or further development of said cutting-lip.

2. An expansible auger comprising in combination with the lead-screw and a single cutting flange or lip developed therefrom, of a radially-adjustable bit having at the bottom a forwardly-projecting cutting edge forming a continuation or further development of said cutting-lip, said bit having its outer end beveled back upwardly and inwardly toward the axis of the auger.

3. An expansible auger comprising in combination with the lead-screw and a single cutting flange or lip developed therefrom, of a radially-adjustable bit having at the bottom a forwardly-projecting cutting edge forming a continuation or further development of said cutting-lip said bit having an outer downward spur.

4. An expansible auger comprising in combination with the lead-screw and a single cutting flange or lip developed therefrom, of a radially-adjustable bit having at the bottom a forwardly-projecting cutting edge forming a continuation or further development of said cutting-lip, said bit being adjustable radially to the auger-axis so that the spur is always in the same vertical radial plane with regard to the auger whatever its adjustment.

Signed at New York, in the county of New York and State of New York, this 5th day of July, A. D. 1905.

THOMAS F. GAYNOR.

Witnesses:
I. W. NEWCOMER,
HENRY I. NEWELL.